United States Patent [19]

Clelland

[11] Patent Number: 5,157,583
[45] Date of Patent: Oct. 20, 1992

[54] SERIES WOUND CAPACITIVE STRUCTURE

[75] Inventor: Ian W. Clelland, Forest, Va.

[73] Assignee: Illinois Tool Works Inc., Glenview, Ill.

[21] Appl. No.: 646,823

[22] Filed: Jan. 28, 1991

[51] Int. Cl.$^5$ .................. H01G 4/38; H01G 7/00
[52] U.S. Cl. .................... 361/329; 29/25.42
[58] Field of Search ............ 29/25.42; 361/303–305, 361/273, 321–323, 328–330

[56] References Cited

U.S. PATENT DOCUMENTS 5,057,967 10/1991 Den et al. ............... 361/328

Primary Examiner—Donald A. Griffin
Attorney, Agent, or Firm—T. W. Buckman; D. J. Breh

[57] ABSTRACT

A capacitor having opposed first and second metallic films separated by a dielectric. The first metallic film includes a first relatively narrow metal-free zone spaced from an edge thereof so as to form a first marginal metal film band at an edge which is spaced by the first metal-free zone from the remainder of the first metallic film. The first metallic film further includes a first metal-free margin lane arranged between the metal-free zone and an edge thereof to separate the first metallic film into first and second segments. The second metallic film includes a second relatively narrow metal-free zone spaced from an edge thereof so as to form a second marginal metal film band at an edge which is spaced by the second metal-free zone from the remainder of the second metallic film. The second metallic film further includes a second metal-free margin lane arranged between the second metal-free zone and an edge thereof to separate the second metallic film into third and fourth segments.

8 Claims, 2 Drawing Sheets

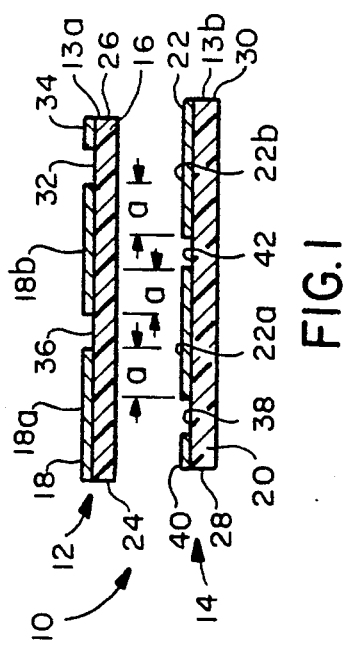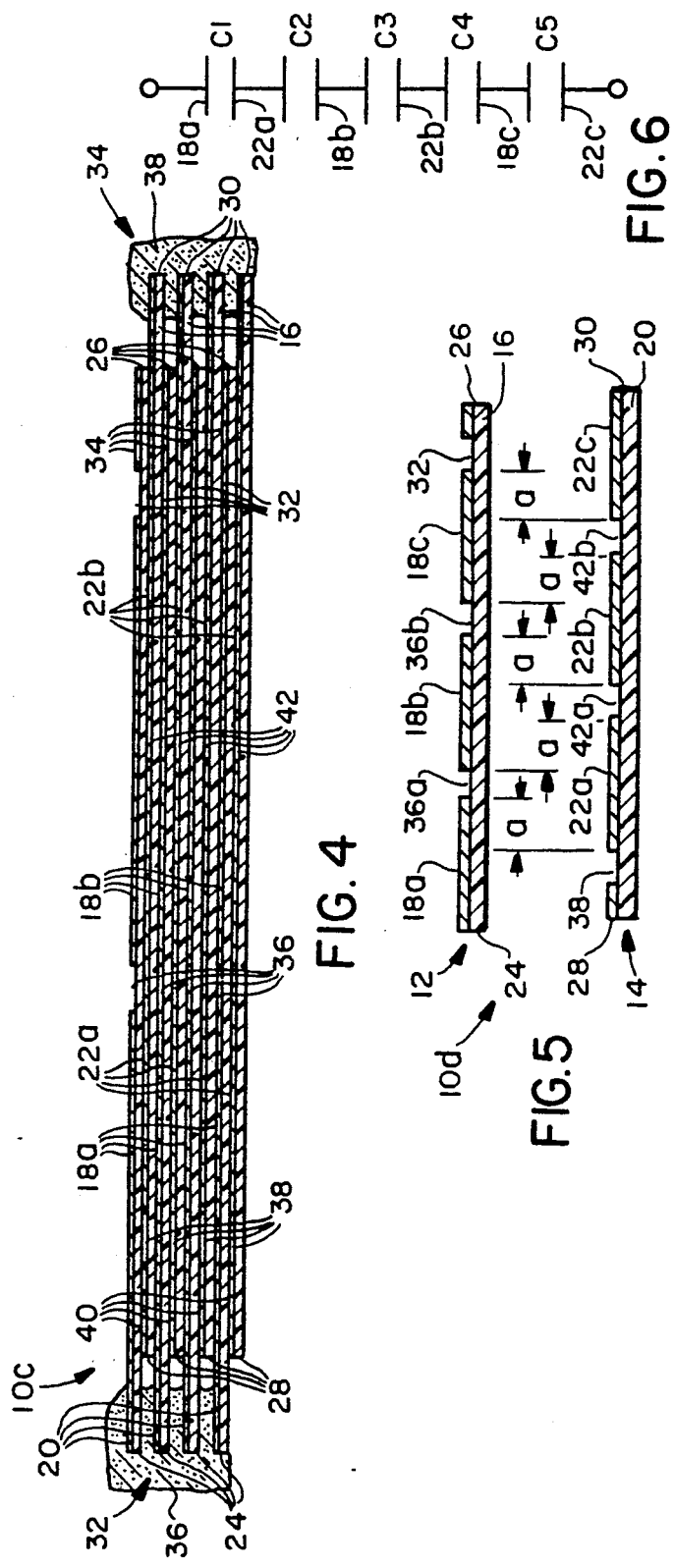

SERIES WOUND CAPACITIVE STRUCTURE

BACKGROUND OF THE INVENTION

1. Field of the Invention

This invention relates generally to layer or stack wound capacitor constructions and more particularly, it relates to an improved capacitive structure which includes a plurality of layers having opposed first and second edges, each layer having a metal-free zone disposed adjacent a narrow marginal film band at the second edge and at least one series metal-free margin lane disposed between the metal-free zone and the first edge.

2. Description of the Prior Art

A prior art search directed to the subject matter of this application in the U.S Pat. and Trademark Office revealed the following U.S. Letters Pat.:

| | |
|---|---|
| 3,292,063 | 4,424,552 |
| 3,483,453 | 4,586,112 |
| 3,508,128 | 4,462,062 |
| 3,651,548 | 4,750,085 |

In U.S. Pat. No. 3,393,063 to D. Kellerman issued on Dec. 13, 1966, there is disclosed a wound capacitor which includes a tubular dielectric core member 14 and a multi-layer film member 12 spirally wound around core member. The film member consists of a first dielectric layer 16 and a second dielectric layer 18. A first electrically conductive layer 20 is formed of a plurality of spaced-apart electrically conductive strips 22 which are disposed between the upper surface of the first dielectric layer and the lower surface of the second dielectric layer. A second electrically conductive layer 38 is also formed of a plurality of spaced apart electrically conductive strips 40 which are disposed between the lower surface of the first dielectric layer and the upper surface of the second dielectric layer. The electrically conductive strips 40 are spaced in staggered relationship to the electrically conductive strips 22.

In U.S. Pat. No. 3,483,453 to R. C. Myers issued on Dec. 9, 1969, there is disclosed a capacitor pack construction formed of a three section series wound, flattened pack which includes laterally separated foils 23, 24 in one layer and laterally separated foils 25, 26 in another layer. The layers are separated by insulating sheets 27 and 28. Foils 23 and 26 extend beyond the edges of the respective insulating sheets 28 and 27. As shown in FIG. 4, the foil 26 overlaps the foil 24 by a distance A. Further, the foil 24 at its edge overlaps the foil 25 by a distance A, and the foil 25 overlaps the foil 23 by a distance A. The areas of overlap define the active foil areas to form the three series connected capacitors.

In U.S. Pat. No. 3,508,128 to W. M. Allison issued on Apr. 21, 1970, there is taught a series-connected pair of split-wound, internally series-wound capacitor sections in which each section includes an inner electrode 10 separated from a first floating electrode 14 by a dielectric spacer 18, a second floating electrode 16 being in capacitive overlap with the first floating electrode 14 and an outermost electrode 12, and a second dielectric spacer 20 separating the electrodes 10 and 16 from the electrodes 12 and 14 when the unit is rolled up.

U.S. Pat. No. 4,586,112 to F. W. MacDougall issued on Apr. 29, 1986, teaches a wound capacitor having two metal foil electrodes 12, 14 arranged side-by-side and sandwiched between two dielectric strips 18, 20. A metallized idler 16 is located on the other side of the dielectric strip 20 from the two foil electrodes 12, 14 (FIG. 1). The metallized idler is formed of a strip of electrically non-conductive paper substrate coated on both sides with a thin layer of metal. The arrangement of the foil electrodes 12, 14 and the idler 16 provides two capacitors connected in series.

U.S. Pat. No. 4,462,062 to C. C. Rayburn issued on Jul. 24, 1984, and assigned to the same assignee as the present invention discloses a capacitive structure which includes a length of a plurality of layers. Each layer has opposed edges and comprises a dielectric substrate and a metallic film. The metallic film extends from one edge toward the other edge. Each layer includes a zone free of metallic film, which zone is spaced from the other edge and defines a narrow marginal metal film band at the other edge which is spaced from the remainder of the metallic film by the metal free zones.

The remaining patents, but not specifically discussed are deemed to be of only general interest and are cited to show the state of the art in capacitive structures having multiple capacitances and the methods for forming the same.

The present invention represents an improvement over the aforementioned U.S. Pat. No. 4,462,062, which is hereby incorporated by reference. The capacitor construction in the '062 patent is basically a one-field, parallel plate sawed edge type. This type of capacitor construction is generally limited to a working voltage application of approximately 400 VDC or 250 VAC. During fabrication process, the capacitor is sawn from a parent capacitor. The saw cuts through the active electrode region. The first set of equipotential electrodes are separated from the second set of equipotential electrodes by the sawn edge of the supporting dielectric films in air. As the voltage is increased between the two sets of equipotential electrodes beyond a permissible level, electric arcs jump from one set of electrodes to the other. Such arcing burns away the evaporated electrode edges and carbonizes the sawn dielectric film edge, thus electrically degrading the capacitor. The maximum safe voltage to avoid arcing varies directly but not linearly with dielectric film thickness. The winding system is limited to PET films having a thickness of ten microns or less, for example.

Accordingly, it would be desirable to provide a capacitive structure which has a significant increase in both AC and DC voltage strengths of the body. In order to produce such an improved capacitive structure, it has been discovered necessarily to add at lease one series metal-free margin lane to each of the plurality of layers in the capacitive structure of the '062 patent. As a result, there is formed a three-section series-connected capacitive structure which functions as three capacitors connected in series for effectively tripling the dielectric breakdown voltage.

The total voltage applied to the capacitor and terminals naturally distributes across each series capacitor section in an inverse relationship to the capacitance of each of the three sections. If the three capacitor sections are manufactured to be of equal capacitance, each section will support one third of the voltage applied across the end terminals. If this voltage is the maximum safe voltage to avoid sawn edge arc-over for that film thickness at the sawn edge, it follows that the voltage applied across the capacitor end terminals can be three times greater without sawn edge arc-over.

SUMMARY OF THE INVENTION

Accordingly, it is a general object of the present invention to provide an improved capacitive structure with at least one series metal-free margin lane disposed in each of the plurality of layers which is relatively simple and economical to manufacture and assemble, but yet overcomes the disadvantages of the prior art capacitor constructions.

It is an object of the present invention to provide an improved capacitive structure which has a significant increase in DC voltage strength of the body.

It is another object of the present invention to provide an improved capacitive structure which has a significant increase in AC voltage strength of the body and an increased corona onset voltage.

It is still another object of the present invention to provide an improved capacitive structure which includes a plurality of layers having opposed first and second edges, each layer having a metal-free zone disposed adjacent a narrow marginal film band at the second edge and at least one series metal-free margin lane disposed between the metal-free zone and the first edge.

In accordance with these aims and objectives, the present invention is concerned with the provision of a capacitive structure which includes a length of a plurality of first layers defining a first group and a length of a plurality of second layers defining a second group. Each of the first layers has opposed first and second edges, and each of the second layers has opposed first and second edges. Each of the first layers includes a first dielectric substrate and a first metallic film. The first metallic film extends from the first edges of the first layers toward the second edges thereof. Each of the second layers includes a second dielectric substrate and a second metallic film. The second metallic film extends from the second edges of the second layers toward the first edges thereof.

The first metallic film includes a first relatively narrow metal-free zone spaced from the second edge thereof so as to form a first marginal metal film band at the second edge which is spaced by the first metal-free zone from the remainder of the first metallic film. The first metallic film further includes a first metal-free margin lane arranged between the first metal-free zone and the first edge thereof to separate the first metallic film into first and second segments. The second metallic film includes a second relatively narrow metal-free zone spaced from the first edge thereof so as to form a second marginal metal film band at the first edge which is spaced by the second metal-free zone from the remainder of the second metallic film. The second metallic film further includes a second metal-free margin lane arranged between the second metal-free zone and the second edge thereof to separate the second metal film into third and fourth segments.

The first layers in the first group are interleaved with the second layers in the second group such that the first and second dielectric substrates separate the first and second segments from the third and fourth segments. The first layers in the first group are offset with the second layers in the second group such that the first edges of the first group extend outwardly beyond the first edges of the second group and the second edges of the second group extend outwardly beyond the second edges of the first group. The outwardly extending first edges of the first group are covered with an electrically conductive coating so as to electrically connect the first segments of each first layers in order to form a first set of external capacitor plates. The outwardly extending second edges of the second group are covered with an electrically conductive coating so as to electrically connect the fourth segments of the second layers in order to form a second set of external capacitor plates.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a cross-sectional view, illustrating two layers of a capacitive structure constructed in accordance with the principles of the present invention, prior to being assembled together;

FIG. 4 is a much enlarged cross-sectional view, illustrating an assembled capacitive structure of the present invention having eight layers;

FIG. 5 is a cross-sectional view, illustrating two layers of a second embodiment of a capacitive structure of the present invention; and FIG. 6 is an electrical equivalent circuit for the capacitive structure of FIG. 5.

DESCRIPTION OF THE PREFERRED EMBODIMENTS

Figure 2:
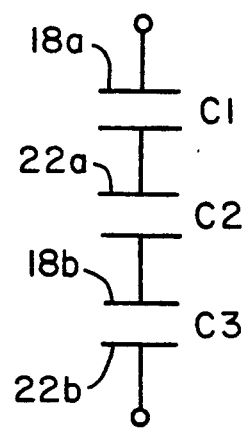
FIG. 2 is an electrical equivalent circuit for the capacitive structure of FIG. 1.

Referring now in detail to the drawings, there is shown in FIG. 1 a cross-sectional view of an improved capacitive structure 10 which is constructed in accordance with the principles of the present invention. The capacitive structure 10 includes a first layer 12 and a second layer 14 which have been shown prior to being assembled together. It should be understood that the first layer 12 represents a part of a single ribbon which has been slitted from a first web into a plurality of individual ribbons. Similarly, the second layer 14 represents a part of a single ribbon which has been slitted from a second web into a plurality of individual ribbons.

As a background and in order to assist in the understanding of the present invention, reference is made to U.S. Pat. No. 4,462,062, which is hereby incorporated by reference. In the '062 patent, there is shown in FIGS. 1-4 a supply roll 2 from which a first web A is withdrawn and a supply roll 4 from which a second web B is withdrawn. The web A is passed to a first web-slitting station, which is comprised of a plurality of spaced parallel razor blades 21a, at which it is slit into a first plurality of ribbons 18a. Likewise, the web B is passed to a second web-slitting station, which is comprised of a plurality of spaced parallel razor blades 21b, for slitting the same into a second plurality of ribbons 18b. The first and second plurality of ribbons 18a, 18b are next passed on to the respective rollers 16a and 16b and then on to the drum 20 for webbing so as to produce a layered pattern, as shown in FIG. 5 of the '062 patent.

Referring again to FIG. 1, the first layer 12 is obtained from a ribbon 13a and includes a first dielectric substrate 16 and a first metallic film 18. The second layer 14 is obtained from a ribbon 13b and includes a second dielectric substrate 20 and a second metallic film 22.

The first and second dielectric substrates 16 and 20 may be of a suitable plastic material such as the resin sold under the trademark "MYLAR." The first and second metallic films 18 and 22 may be vapor deposited aluminum. The substrates 16 and 20 are made of a very thin layer having a thickness on the order of one-tenthousandth of an inch. The metallic films 18 and 22 are also made of an extremely thin layer having a thickness on the order of 500 angstroms.

The first layer 12 has opposed left and right-handed side edges 24 and 26, and the second layer 14 has opposed left and right-handed side edges 28 and 30. The second layer 14 is disposed in an offset relationship to the first layer 12 such that the side edge 24 of the first layer extends laterally and outwardly beyond the side edge 28 of the second layer and such that the side edge 30 of the second layer 14 extends laterally and outwardly beyond the side edge 26 of the first layer 12.

The first metallic film 18 includes a relatively narrow demetallized or metal-free zone 32 which is spaced apart from the side edge 26 so as to form a marginal metal film band 34 on the ribbon 13a. The first metallic film 18 further includes a series metal-free margin lane 36 arranged between the metal-free zone 32 and the side edge 24. The margin lane 36 is preferably disposed substantially intermediate the zone 32 and the side edge 24 so as to divide the first metallic film into an end segment 18a and an intermediate segment 18b. The second metallic film 22 includes a relative narrow demetallized or metal-free zone 38 which is spaced from the side edge 28 so as to form a marginal metal film band 40 on the ribbon 13b. The second metallic film 22 further includes a series metal-free margin lane 42 arranged between the metal-free zone 38 and the side edge 30. The margin lane 42 is preferably disposed substantially intermediate the zone 38 and the side edge 30 so as to divide the second metallic film into an intermediate segment 22a and an end segment 22b.

As can be seen from FIG. 1, the end segment 18a overlaps the intermediate segment 22a by a distance a. Also, the intermediate segment 22a at its other edge overlaps the intermediate 18b by the same distance a. Lastly, the intermediate segment 18b at its other edge overlaps the end segment 22b by the distance a. The areas of overlap thus formed represents the active plate areas and comprises a triple series-connected capacitive structure. The electrical equivalent circuit for the capacitive structure of FIG. 1 is illustrated in FIG. 2 representing three capacitors C1, C2 and C3 connected in series.

Figure 3:
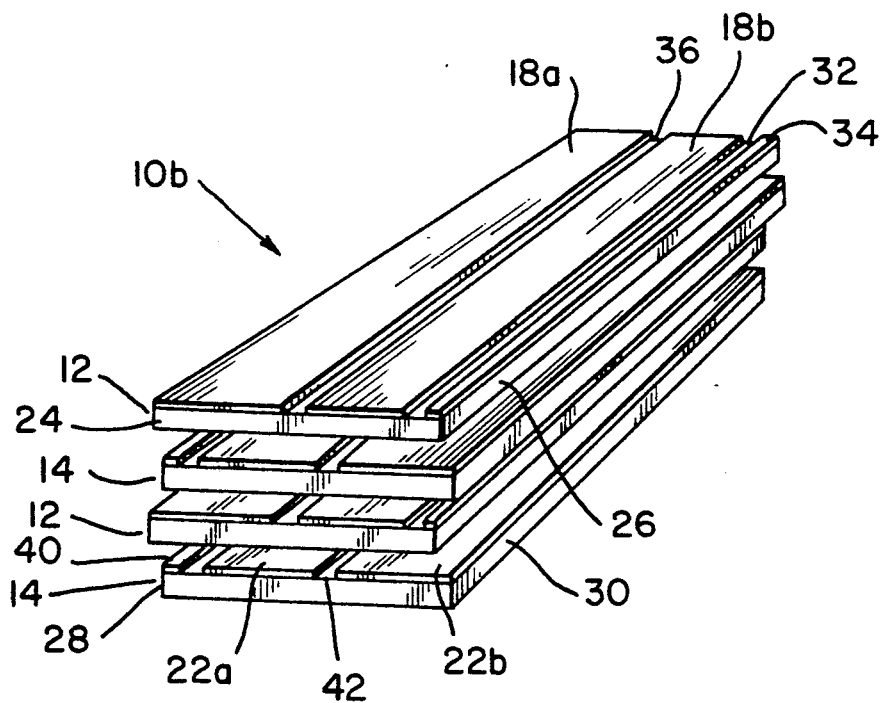
FIG. 3 is a fragmentary, perspective view illustrating four layers of a capacitive structure of the present invention.

In FIG. 3, there is shown a fragmentary, perspective view of a capacitive structure 10a of the present invention which has a first group of first layers 12 referenced and offset with respect to a second group of second layers 14. It will be noted that each of the adjacent layers 12, 14 are illustrated as being spaced apart from the next adjacent layer for the sake of clarity. Further, it should be understood that the first layers 12 have been cut at the edges 24, 26 and the second layers 14 have been cut at the edges 28, 30 so as to form a length of the capacitive structure. The thusformed length of capacitive structure is then subjected to pressure and heat to create a substantially rigid capacitive stick (not shown). Next, the capacitive stick can then be cut transversely to form individual capacitor units.

In FIG. 4 of the drawings, there is illustrated a much enlarged cross-sectional view of an assembled capacitive 10b of the present invention having a first group 32 of first layers 12 interleaved and offset with respect to a second group 34 of second layers 14. The first group 32 is comprised of four such layers 12, and the second group 34 is also comprised of four such layers 14. It will be noted that at the edges 24 of the layers 12 in the first group 32 the metallic film end segment 18a and the dielectric substrate 16 project laterally and outwardly beyond the adjacent edges 28 of the layers 14 in the second group 34. A metallic spray coating 36 of an electrically conductive material is applied in a conventional manner so as to electrically connect the metallic film end segments 18a in order to form a first set of external capacitor electrodes or plates.

Similarly, it will be noted at the edges 30 of the layers 14 of the second group 34 the metallic film end segments 22b and the dielectric substrate 20 project laterally and outwardly beyond the adjacent edges 26 of the layers 12 in the first group 32. Further, a metallic spray coating 38 of an electrically conductive material is applied so as to electrically connect the metal film end segments 22b in order to form a second set of external capacitor electrodes or plates.

It should be apparent that the series metal-free margin lanes 36 formed in each of the first layers 12 of the first group 32 separates the metallic film end segments 18a from the metallic film intermediate segments 18b defining a first set of internal floating electrodes or plates. Also, the series metal-free margin lanes 42 formed in each of the second layers 14 of the second group 34 separates the metal film end segments 22b from the metal film intermediate segments 22a defining a second set of internal floating electrodes or plates. By creating such first and second sets of internal floating plates disposed between the first and second sets of external plates, there is formed a three-section series-connected capacitive structure which acts effectively as three capacitors in series. A first section defining a first capacitor is formed between the end segment 18a and the internal floating plate 22a. A second section defining a second capacitor is formed between the floating plate 22a and the floating plate 18b. A third section defining a third capacitor is formed between the floating electrode 18b and the end segment 22b. Since each of the three capacitors is required to handle only a portion of the applied voltage between the first and second sets of external plates, the dielectric breakdown voltage has been, in essence, tripled.

The addition of one series metal-free margin lane per layer in each of the first and second groups 32 and 34 has provided in effect three capacitors connected in series. A series of five capacitors can be produced by creating two series metal-free lanes per layer in each of the first and second groups. In FIG. 5, there is shown a second embodiment of a capacitive structure 10c of the present invention in which the layer 12 has two series metal-free margin lanes 36a and 36b and the layer 14 has two series metal-free margin lanes 42a and 42b. The margin lanes 36a and 36b are preferably of the same width which serves to divide the metal film 18 into three segments 18a–18c, each segment being of substantially the same width. Likewise, the margin lanes 42a and 42b are preferably of the same width which serves to divide the metal film 22 into three segments 22a–22c, each segment being of substantially the same width. The electrical equivalent circuit for the capacitive structure 10c of FIG. 5 is illustrated in FIG. 6 representing five capacitors C1–C5 connected in series.

Alternatively, there can be provided any number of margin lanes per layer dependent upon the desired number of capacitors to be connected in series. Further, the margin lanes may be formed by laser beams which may be utilized to burn off the deposited metal. This is identical to the manner in which the metal-free zones may be formed, as is illustrated in FIG. 8 of the '062 patent.

It should be readily apparent to those skilled in the art that a number of variations can be made to applicant's invention without departing from the true scope and spirit thereof. For example, the width and spacing of the margin lanes 36a, 36b, 42a, 42b and the width of the individual segments 18a-18c and 22a-22c may be varied to provide any degree of variations in the capacitance values between the individual capacitors contained between the first and second external plates.

From the foregoing detailed description, it can thus be seen that the present invention provides an improved capacitive structure which includes a plurality of layers having opposed first and second edges, each layer having a metal-free zone disposed adjacent a narrow marginal film band at the second edge and at least one series metal-free margin lane disposed between the metal-free zone and the first edge. The capacitive structure of the present invention has a significant increase in both AC and DC voltage strengths of the body.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A capacitive structure comprising:
   a length of a plurality of first layers defining a first group, each of such first layers having opposed first and second edges;
   a length of a plurality of second layers defining a second group, each of said second layers having opposed first and second edges;
   each of said first layers including a first dielectric substrate and a first metallic film, said first metallic film extending from the first edges of said first layers toward the second edges thereof;
   each of said second layers including a second dielectric substrate and a second metallic film, said second metallic film extending from the second edges of said second layers toward the first edges thereof;
   said first metallic film including a first relatively narrow metal-free zone spaced from the second edge thereof so as to form a first marginal metal film band at the second edge which is spaced by said first metal-free zone from the remainder of said first metallic film;
   said first metallic film further including a first metal-free margin lane arranged between said first metal-free zone and the first edge thereof to separate said first metal film into first and second segments;
   said second metallic film including a second relatively narrow metal-free zone spaced from the first edge thereof so as to form a second marginal metal film band at the first edge which is spaced by said second metal-free zone from the remainder of said second metal metallic film;
   said second metallic film further including a second metal-free margin lane arranged between said second metal-free zone and the second edge thereof to separate said second metallic film into third and fourth segments;
   said first layers in said first group being referenced with said second layers in said second group such that said first and second dielectric substrates separate said first and second segments from said third and fourth segments;
   said first layers in said first group being offset with said second layer in said second group such that said first edges of said first group extend outwardly beyond said first edges of said second group and said second edges of said second group extend outwardly beyond said second edges of said first group;
   said outwardly extending first edges of said first group being covered with an electrically conductive coating so as to electrically connect said first segments of said first layers in order to form a first set of external capacitor plates; and
   said outwardly extending second edges of said second group being covered with an electrically conductive coating so as to electrically connect said fourth segments of said second layers in order to form a second set of external capacitor plates.

2. A capacitive structure as claimed in claim 1, wherein said first and second margin lanes are substantially equal in width.

3. A capacitive structure as claimed in claim 2, wherein said first and second segments are substantially equal in width.

4. A capacitive structure as claimed in claim 3, wherein said third and fourth segments are substantially equal in width.

5. A capacitive structure as claimed in claim 4, wherein said second segments define a first set of internal floating plates.

6. A capacitive structure as claimed in claim 5, wherein said third segments define a second set of internal floating plates.

7. A capacitive structure as claimed in claim 6, wherein said first and second margin lanes are formed by laser beams.

8. A capacitive structure comprising:
   a length of a plurality of first layers defining a first group, each of such first layers having opposed first and second edges;
   a length of a plurality of second layers defining a second group, each of said second layers having opposed first and second edges;
   each of said first layers including a first dielectric substrate and a first metallic film, said first metallic film extending from the first edges of said first layers toward the second edges thereof;
   each of said second layers including a second dielectric substrate and a second metallic film, said second metallic film extending from the second edges of said second layers toward the first edges thereof;
   said first metallic film including a first relatively narrow metal-free zone spaced from the second edge thereof so as to form a first marginal metal film band at the second edge which is spaced by said first metal-free zone from the remainder of said first metallic film;

said first metallic film further including a first plurality of metal-free margin lanes arranged between said first metal-free zone and the first edge thereof to separate said first metal film into end and intermediate segments;

said second metallic film including a second relatively narrow metal-free zone spaced from the first edge thereof so as to form a second marginal metal film band at the first edge which is spaced by said second metal-free zone from the remainder of said second metal metallic film;

said second metallic film further including a second plurality of metal-free margin lanes arranged between said second metal-free zone and the second edge thereof to separate said second metallic film into end and intermediate segments;

said first layers in said first group being referenced with said second layers in said second group such that said first and second dielectric substrates separate said end and intermediate segments of said first metallic film from said end and intermediate segments of said second metallic film;

said first layers in said first group being offset with said second layer in said second group such that said first edges of said first group extend outwardly beyond said first edges of said second group and said second edges of said second group extend outwardly beyond said second edges of said first group;

said outwardly extending first edges of said first group being covered with an electrically conductive coating so as to electrically connect said end segments of each first layers in order to form a first set of external capacitor plates; and said outwardly extending second edges of said second group being covered with an electrically conductive coating so as to electrically connect said end segments of said second layers in order to form a second set of external capacitor plates.

* * * * *